(12) United States Patent
Horn (10) Patent No.: US 8,454,396 B2
(45) Date of Patent: Jun. 4, 2013

(54) TERMINAL WELD TAB HAVING A WIRE SQUEEZE LIMITER

(75) Inventor: Thomas A. Horn, Eastpointe, MI (US)

(73) Assignee: BorgWarner Inc., Auburn Hills, MI (US)

(*) Notice: Subject to any disclaimer, the term of this patent is extended or adjusted under 35 U.S.C. 154(b) by 488 days.

(21) Appl. No.: 12/373,810

(22) PCT Filed: Jul. 18, 2007

(86) PCT No.: PCT/US2007/073758
§ 371 (c)(1),
(2), (4) Date: Sep. 2, 2009

(87) PCT Pub. No.: WO2008/011449
PCT Pub. Date: Jan. 24, 2008

(65) Prior Publication Data
US 2010/0035484 A1 Feb. 11, 2010

Related U.S. Application Data (60) Provisional application No. 60/831,757, filed on Jul. 19, 2006, provisional application No. 60/909,739, filed on Apr. 3, 2007.

(51) Int. Cl.
*H01R 4/02* (2006.01)
(52) U.S. Cl.
USPC .......................................................... 439/874
(58) Field of Classification Search
USPC ................... 439/874, 873, 876, 888, 395, 82, 439/556, 572, 746; 29/879
See application file for complete search history.

(56) References Cited

U.S. PATENT DOCUMENTS

| | | | |
|---|---|---|---|
| 3,649,743 A | | 3/1972 | O'Loughlin |
| 3,907,400 A | * | 9/1975 | Dennis ........................... 439/873 |
| 4,548,450 A | * | 10/1985 | Reimer et al. ................... 439/82 |
| 5,651,391 A | | 7/1997 | Connolly |
| 6,343,621 B1 | | 2/2002 | Holmes |
| 6,571,757 B1 | | 6/2003 | Simpson |
| 6,607,172 B1 | | 8/2003 | Green |
| 6,722,898 B2 | * | 4/2004 | Peloza et al. ................... 439/108 |
| 6,907,901 B2 | | 6/2005 | Holmes |
| 2005/0121089 A1 | | 6/2005 | Morgan |
| 2005/0269538 A1 | | 12/2005 | Haynes |
| 2007/0155219 A1 | * | 7/2007 | Freakes ........................ 439/395 |

FOREIGN PATENT DOCUMENTS

| | | |
|---|---|---|
| FR | 1418608 A | 11/1965 |
| WO | 2006/005291 A | 1/2006 |

OTHER PUBLICATIONS

International Search Report for PCT/US2007/073758 Form PCT/ISA/220 Mailed May 26, 2008.
Written Opinion for PCT/US2007/073758 Form PCT/ISA/237.

* cited by examiner

*Primary Examiner* — Edwin A. Leon
(74) *Attorney, Agent, or Firm* — BrooksGroup (57) ABSTRACT

One embodiment includes an electrical connection terminal (20) including at least a first weld tab (22). The first weld tab (22) including an outer face (23) and a weldable inner face (33). The weldable inner face (33) includes a substantially planar first portion (25) and a substantially planar second portion (27), and wherein the first portion (25) and second portion (27) are not in the same plane.

16 Claims, 9 Drawing Sheets

TERMINAL WELD TAB HAVING A WIRE SQUEEZE LIMITER

CROSS-REFERENCE TO RELATED APPLICATIONS

This application claims the benefit of U.S. Provisional Application No. 60/831,757 filed Jul. 19, 2006 and claims the benefit of U.S. Provisional Application No. 60/909,739 filed Apr. 3, 2007.

TECHNICAL FIELD

The field to which the disclosure generally relates includes products including an electrical connection terminal and methods of making and using the same.

BACKGROUND

Electrical connection terminals have been soldered, welded, or crimped to wires or connection posts. The terminals typically may include a female connection portion, male connection portion or a press electrical connection portion for making an electrical connection by pressing to another terminal. Heretofore, a wire has been wrapped around a connection post of a solenoid coil and a terminal has been welded to the wire.

SUMMARY OF EXEMPLARY EMBODIMENTS OF THE INVENTION

One embodiment of the invention includes a product comprising an electrical connection terminal comprising at least a first weld tab. The first weld tab comprises an outer face and a weldable inner face. The weldable inner face comprises a substantially planar first portion and a substantially planar second portion, and wherein the first portion and the second portion are not in the same plane.

Another embodiment of the invention includes a product comprising an electrical connection terminal constructed and arranged to be welded to a post and a portion of a wire of a magnetic coil of a solenoid valve. The terminal comprises a weld tab comprising a magnetic wire squeeze limiter.

Another embodiment of the invention includes a process comprising providing a post and a portion of a wire wound around a portion of the post leaving a portion of the post exposed. An electrical connection terminal is provided that includes at least a first weld tab comprising an outer face and a weldable inner face. The weldable inner face comprises a substantially planar first portion and a substantially planar second portion, and wherein the first portion and the second portion are not in the same plane. The substantially planar first portion is welded to the exposed portion of the post. Another embodiment further includes welding the substantially planar second portion to the portion of the wire wound around the post.

Other exemplary embodiments of the present invention will become apparent from the detailed description provided hereinafter. It should be understood that the detailed description and specific examples, while indicating the exemplary embodiment of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 3:
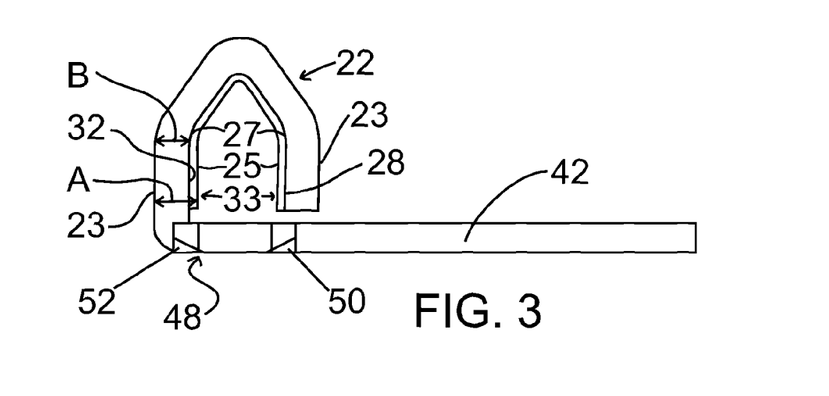
FIG. 3 illustrates a product of FIG. 1 viewed from the bottom along line 3 of FIG. 1.
Figure 4:
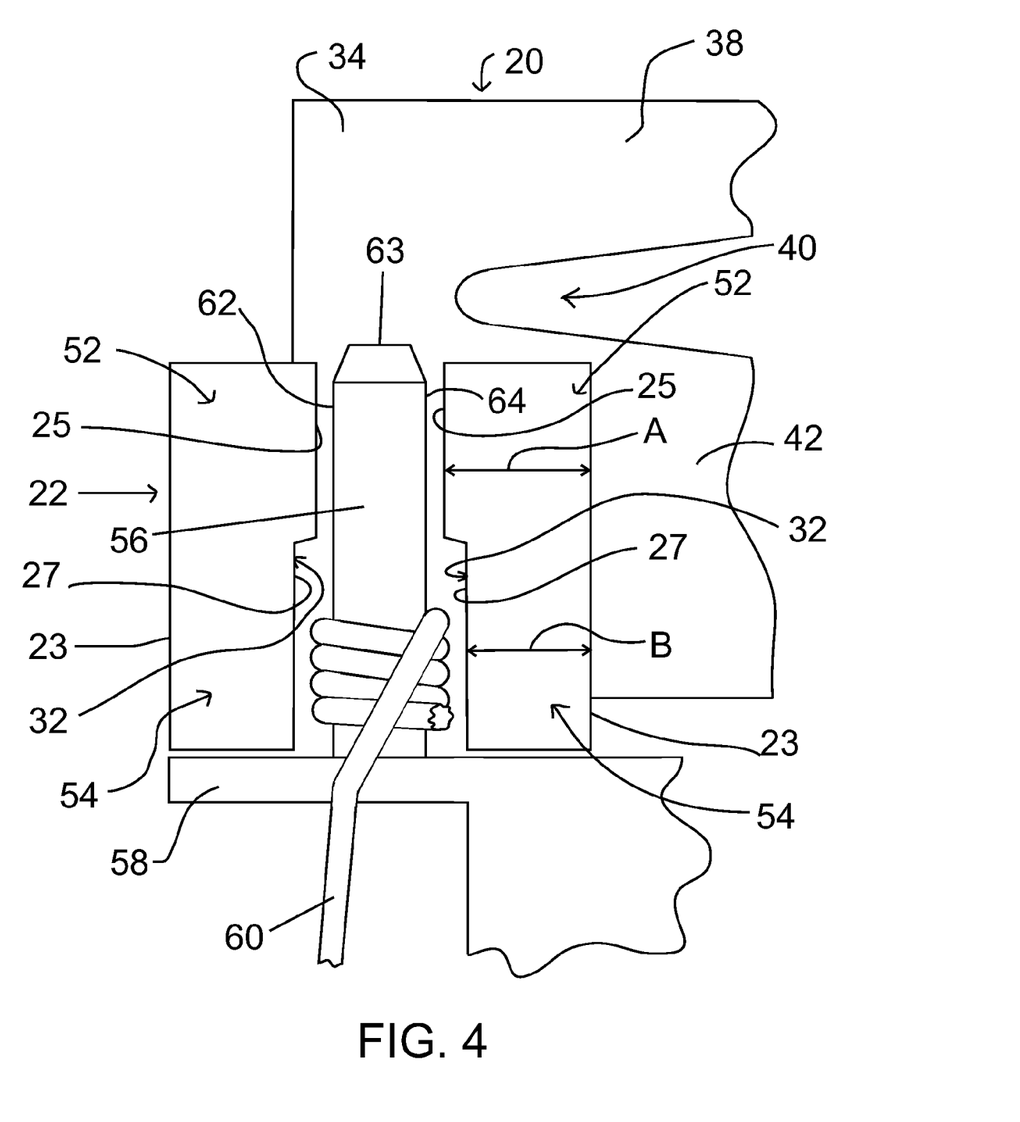
FIG. 4 illustrates a product according to one embodiment of the invention including an electrical connection terminal and a solenoid valve including a post having a portion of the wire wound around the post.

Referring now to FIGS. 1-4, one embodiment of the invention includes a product which may be an electrical connection terminal 20 having at least one terminal weld tab 22. The terminal weld tab 22 includes at least a first tab segment 24. Preferably, the terminal weld tab 22 includes a second tab segment 26 having a free end 30. A third tab segment 28 may be interposed between the first tab segment 24 and the second tab segment 26. The terminal weld tab 22 may be bent so that the first tab segment 24, second tab segment 26, and third tab segment 28 wrap around a portion of a post 56 to which the terminal weld tab 22 will be welded as described hereafter. Each of the first tab segment 24, second tab segment 26, and third tab segment 28, if present, may include an outer face 23 and a weldable inner face 33. The weldable inner face 33 may include a coined portion 32. The weldable inner face 33 may include a substantially planar first portion 25 and a substantially planar second portion 27, and wherein the first portion 25 and second portion 27 are not in the same plane. As shown in FIG. 3, terminal weld tab 22 may be constructed and arranged so that it includes a first portion 52 extending from the outer face 23 to the substantially planar first portion 25 of the weldable inner face 33 that has a first thickness illustrated by line A. A second portion 54 of the weld tab has a thickness extending from the outer face 23 to the substantially planar second portion 27 of the weldable inner face 33, illustrated by line B, thus providing a coined portion 32. The coined portion 32 of the terminal weld tab 22 is constructed and arranged to provide a magnetic wire squeeze limiter which limits the amount of pressure that can be applied to a wire 60 wrapped around a post 56 during the welding process as will be described hereafter. The coined portion 32 may be made, for example, by stamping or roll pressing a portion of the weld tab 22. In one embodiment, the coined area (indentation) is 0.23 mm and the thickness of the first portion 52 (line A) is 0.8 mm and the thickness of the second portion 54 (line B) is 0.57 mm. The post 56 may be secured to a bobbin 58 around which the wire 60 may be wrapped to provide a magnetic coil. For example, in one embodiment of the invention, a square post 56 may be press fit into a round hole formed in the bobbin 58 to secure the post 56 to the bobbin 58.

Figure 1:
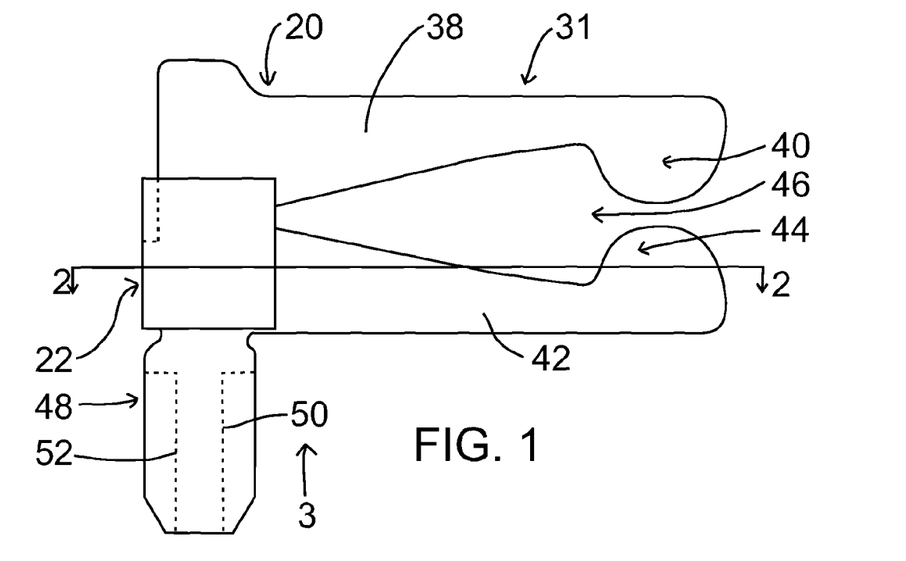
FIG. 1 illustrates one embodiment of the invention including a product including an electrical connection terminal.
Figure 2:
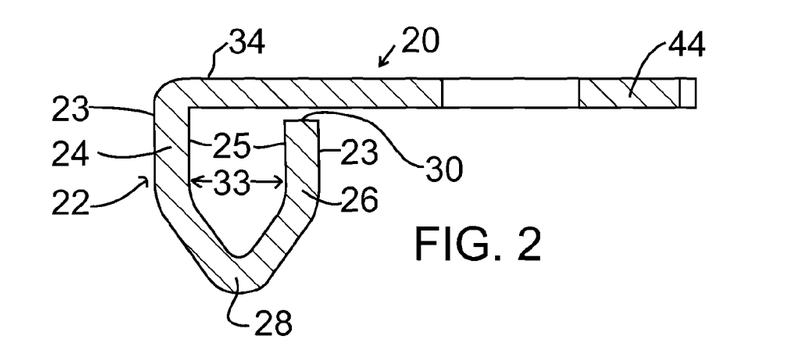
FIG. 2 illustrates a sectional view taken along the line 2-2 of FIG. 1.

The electrical connection terminal 20 may further include a body portion 34 from which the terminal weld tab 22 may extend. An electrical connector portion 31 may also extend from the body portion 34 for making an electrical connection to another terminal. The electrical connection portion 31 may have any configuration known to those skilled in the art including, but not limited to, a female portion, male portion or a press terminal portion constructed and arranged to make electrical contact by pressing to a portion of another terminal. The embodiment illustrated in FIGS. 1-4 includes a female portion including an upper jaw 38 which may have a first nub 40 near an end thereof and a lower jaw 42 which may have a second nub 44 near an end thereof. An opening 46 is provided between the upper jaw 38 and lower jaw 44, for example, to receive a male blade of another terminal. As shown in FIG. 1, the electrical terminal 20 may further include a support blade 48 and coined areas 50, 52. The support blade may be press fit into a slot formed in the bobbin 58 to secure the terminal to the bobbin 58. The coined areas 50, 52 provide additional strength.

Figure 5:
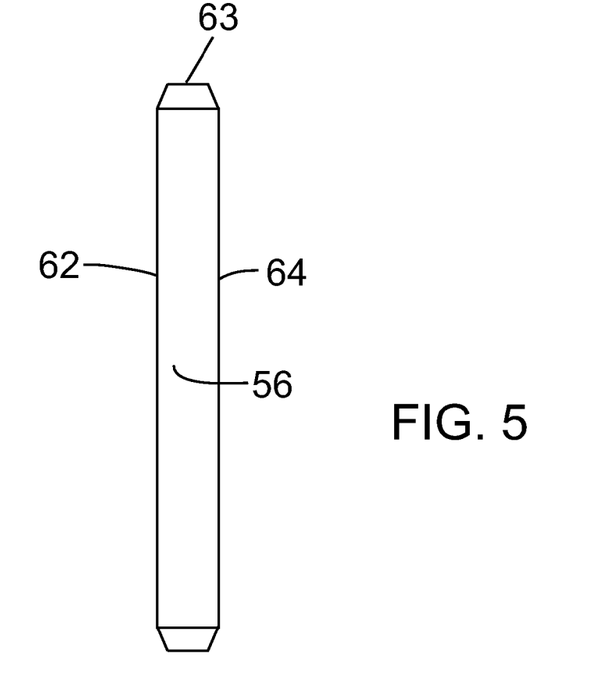
FIG. 5 illustrates one embodiment of a post useful in the present invention.
Figure 6:
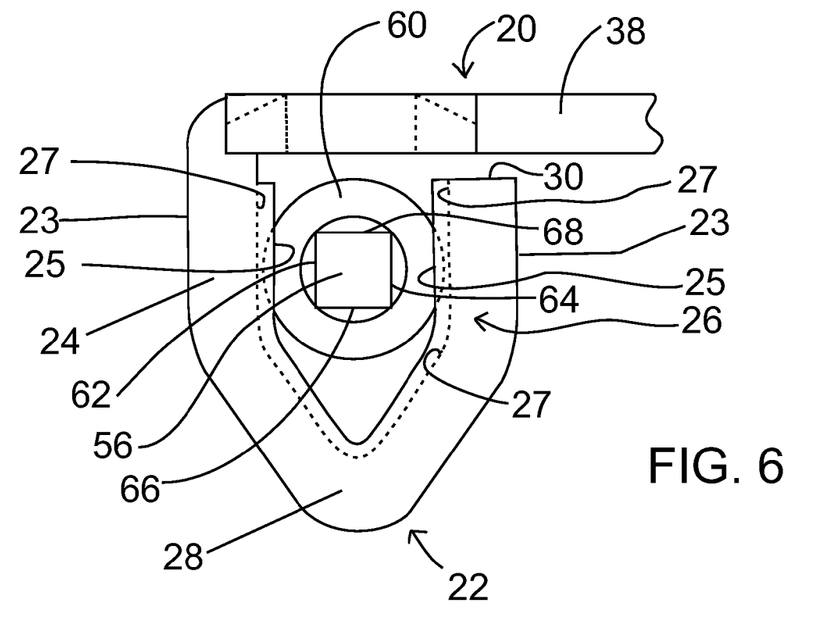
FIG. 6 is a top view of a product including an electrical connection terminal having a weld tab positioned over a portion of a post having a wire wound around the post according to one embodiment of the invention.

Referring now to FIGS. 5-6, in one embodiment of the invention, the post 56 may include a first flat face 62 and an opposite second flat face 64. In another embodiment, the post 56 may include a third flat face 66 and an opposite fourth flat face 68, and a top 63. The electrical terminal 20 is placed so that the substantially planar first portion 25 of the weldable inner face 33 is positioned adjacent the first flat face 62 of the exposed portion of post 56. Likewise, the substantially planar first portion 25 of the weldable inner face 33 of the second tab segment 26 is positioned adjacent the second flat face 64 of the exposed portion post 56. The substantially planar second portion 27 of the weldable inner face 33 of the first segment 24 and second segment 26 are positioned adjacent to the portion of the wire 60 wrapped around the post 56.

Figure 7:
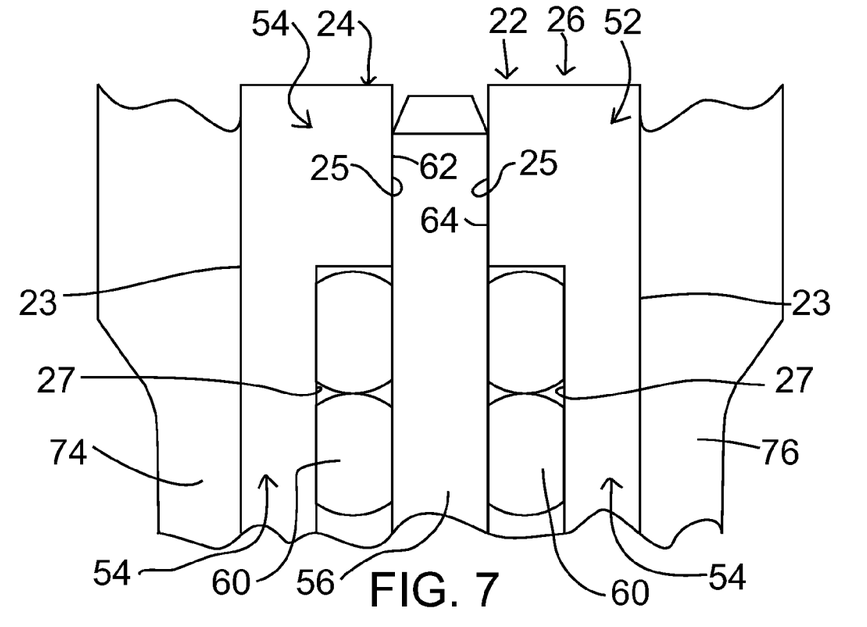
FIG. 7 illustrates a method of welding an electrical connection terminal having a weld tab around a post having a wire wound around the post.

Referring now to FIG. 7, one embodiment of the invention includes a process in which a first welding electrode 74 is placed against the outer face 23 of the weld terminal tab 22 such that the substantially planar first portion 25 of the first segment 24 engages the first flat face 62 of the exposed portion of post 56 so that the substantially planar first portion 25 of the first segment 24 is welded to the flat face 62 of the exposed portion of the post 56. A second weld electrode 76 is pressed against the outer face 23 of the second segment 26 of the terminal weld tab 22 so that the substantially planar first portion 25 of the second segment 26 is welded to the flat face 64 of the exposed portion of post 56. At the same time, the substantially planar second portion 27 of the first segment 24 and the substantially planar second portion 27 of the second segment 26 are each welded to a portion of the wire 60 wrapped around the post 56. In one embodiment of the invention, suitable welding parameters include, but are not limited to, about 0.7-0.76 Volts and at a pressure ranging from about 9 to about 15 pounds force.

Figure 8:
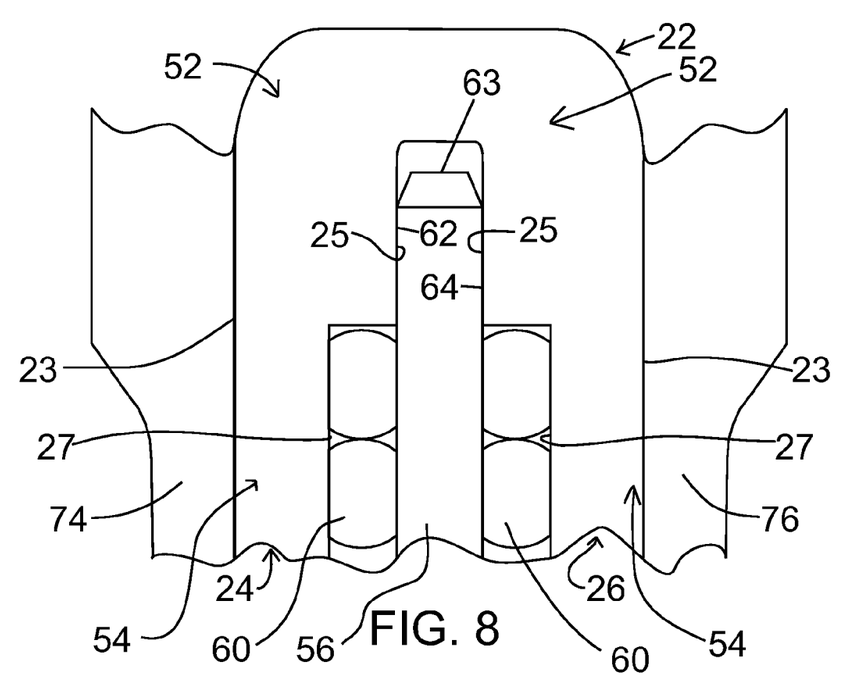
FIG. 8 illustrates a process according to another embodiment of the invention including welding a weld tab to a post having a wire wound around the portion thereof.

Referring now to FIG. 8, another embodiment of the invention includes a weld tab 22 which, instead of being wrapped around the post 56 as shown in FIG. 7, is wrapped over the top 63 of the post 56. A first portion 52 and second portion 54 may still be provided on the weld tab 22.

Figure 9:
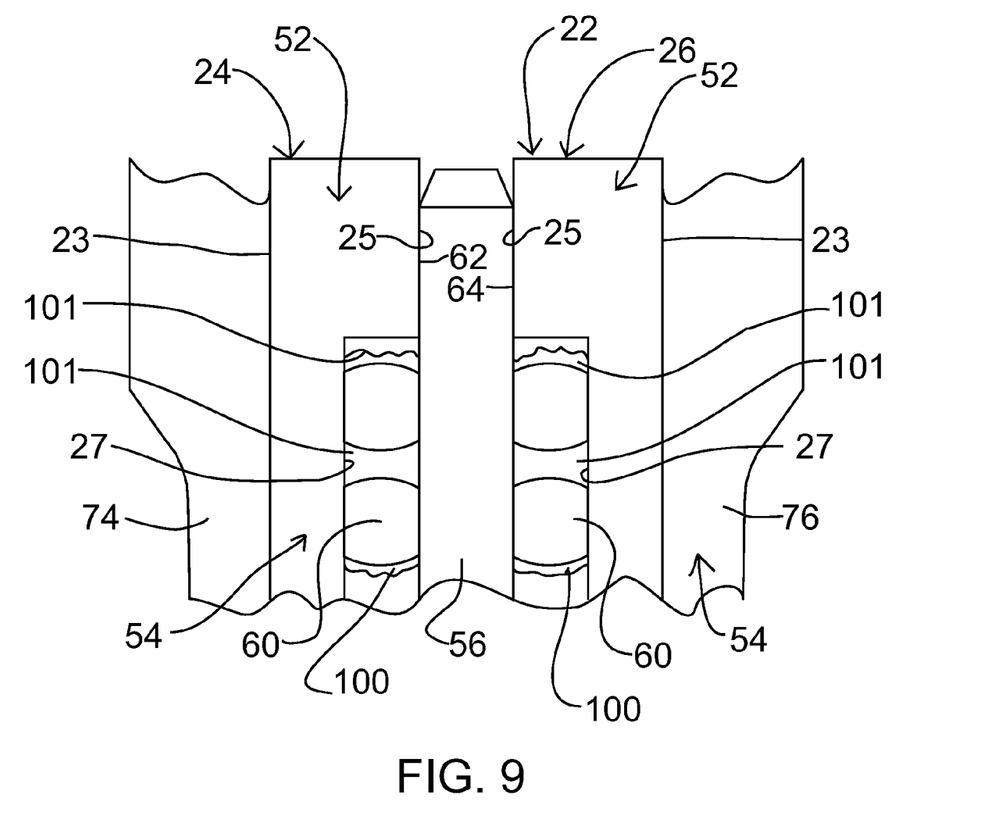
FIG. 9 illustrates a process according to another embodiment of the invention including welding an electrical connection terminal to a post and a wire having an insulation layer thereon and the wire being wound around a portion of the post so that the welding process ashes the insulation.

Referring now to FIG. 9, another embodiment of the invention includes using a wire 60 including an insulative coating 101 thereon. As the weld tab 22 is welded to the post 56 and the wire 60, the insulative coating 101 is ashed during the welding process. With reference to the embodiments illustrated by FIGS. 7-9, the electrodes 74, 76 may be constructed and arranged and the welding process conducted such that greater pressure may be applied by the electrodes 74, 76 to the first section 52 of each of the first segment 24 and second segment 26 of the weld tab compared to the second section 54 of the weld tab 22 so that the pressure applied to the wire 60 wrapped around the post 56 is limited.

Figure 10:
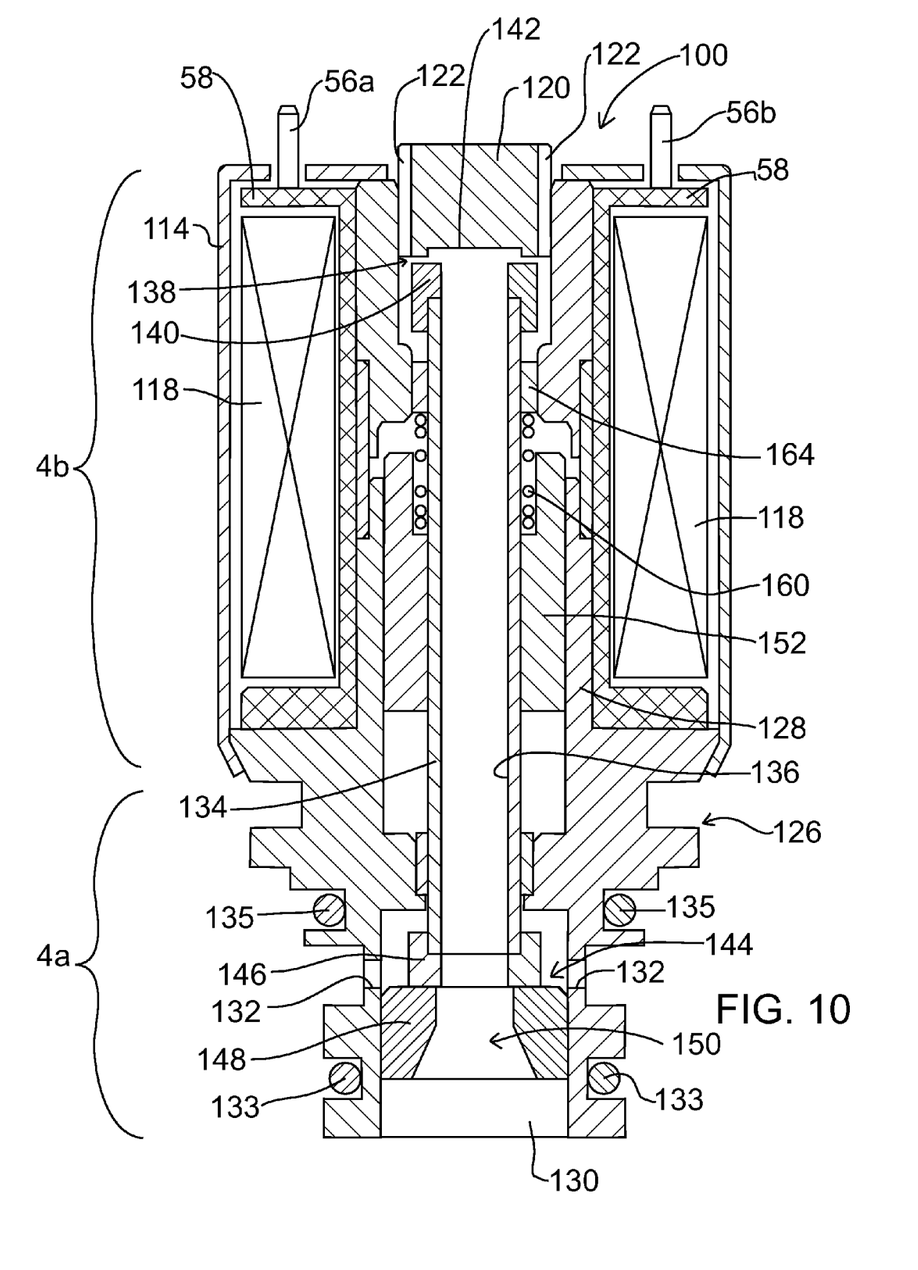
FIG. 10 illustrates a solenoid valve including a terminal post connected to the bobbin of a magnetic coil useful in the present invention.

Referring now to FIG. 10, one embodiment of the invention includes a product 100 which may be a dual-poppet low leak variable bleed solenoid valve. The valve 100 may include a solenoid portion 124b which includes a housing 114 that encases a bobbin 58 having a coil 118 wound around the bobbin 58. The coil 118 is made from the wire 60. A first terminal post 56a is secured to the bobbin 58 in one position and extends through the housing 114. The first post 56a, for example, may be used as a positive terminal for the coil 118. A second post 56b is provided in a second location and secured to the bobbin 58 and extends through the housing 114. The second post 56b, for example, may be utilized as a negative post for the coil 118. An electrical connection terminal 20 (not shown) according to one of the various embodiments of the invention as disclosed herein may be welded to each of the first post 56a and second post 56b. The solenoid portion 124b may also include an end cap 120 that has exhaust ports 122 disposed about the end cap 120.

The valve 100 may have a hydraulic portion 124a that has a valve housing 126 that is connected to the solenoid portion 124b. The valve housing 126 may include a flux tube portion 128 that slides into the solenoid portion 124b adjacent to the bobbin 58. The hydraulic portion 124a may also include a volume control 130 that is located at the end of the valve housing 126. A supply port 132 is connected through the valve housing 126 at a position located above the control volume 130. The valve housing 126 may be mated to an external bore and a first O-ring seal 133 separates the supply pressure region that is external to the valve housing 126 from the volume control 130. A second O-ring seal 135 separates the supply pressure region that is external to the valve housing 126 from the ambient or sump pressure region. A valve shaft 134 may be provided and is slidably disposed through the solenoid portion 124b and extends longitudinally into the hydraulic portion 124a. The valve shaft 124 includes a channel 136 therethrough that allows the passage of fluid from the hydraulic portion 124a to the solenoid portion 124b. The channel 136 includes a first end that terminates at a primary valve 138 located within the solenoid portion 124b. The primary valve 138 is formed of a primary poppet 140 that is formed about the end of the valve shaft 134, and a primary valve seat 142 that is formed at the end cap 120. Together the primary poppet 140 and the primary valve seat 142 form the primary valve 138 which is opened and closed by the sliding of the valve shaft 134 along its longitudinal axis.

The channel 136 has a second end that terminates at a secondary valve 144 located in the hydraulic portion 124a. The secondary valve 144 is formed of a secondary poppet 146 which is the end of the valve shaft 134. The secondary poppet 146 is configured to slidably seat against the secondary valve seat 48 which has an aperture 150 that extends through the secondary valve seat 148 to the control volume 130.

In operation, the valve 100 functions in response to current flowing through the coil 118. When an increasing current is applied to the coil 118, the valve shaft 134 will slide in a first direction along its longitudinal axis. In order to facilitate the movement of the valve shaft, an armature 152 is annually disposed about and fixed to the valve shaft 134. The armature 152 is affected by the magnetic flux generated as a result of current flowing through the coil 118. This causes a linear movement of the valve shaft 134 that is proportional to the degree of current flowing through the coil 118 in the solenoid portion 124b. When the solenoid portion 124b is energized, the valve shaft 134 will slide in a first direction towards the end cap 120 so that the primary poppet 140 will seat against the primary valve seat 142, thus closing off the primary valve 138. Simultaneously, the secondary valve 144 will be opened as the movement of the valve shaft 134 will cause the secondary poppet 146 to move away from the secondary valve seat 148. When the current flowing through the coil 118 is stopped or reduced, the solenoid portion 124b is de-energized and a spring 160 will cause the armature 152 to slide in a second direction opposite the movement of the armature when the coil is energized. The spring 160 may be disposed about the armature 152 and the upper bearing 164. When the solenoid portion 124b is de-energized, the spring 160 will exert a force against the armature 152 to cause the valve shaft 134 to move in the opposite direction so that the secondary valve 144 is closed as the secondary poppet 146 contacts the secondary valve seat 148. Simultaneously, the primary valve 138 will move to a fully open position as the primary poppet 140 moves away from the primary valve seat 142. These and other features, and operations of the embodiment illustrated in FIG. 10 are disclosed in U.S. Patent Application No. 2005/0269538, filed Jun. 7, 2004, the disclosure of which is hereby incorporated by reference.

Figure 11:
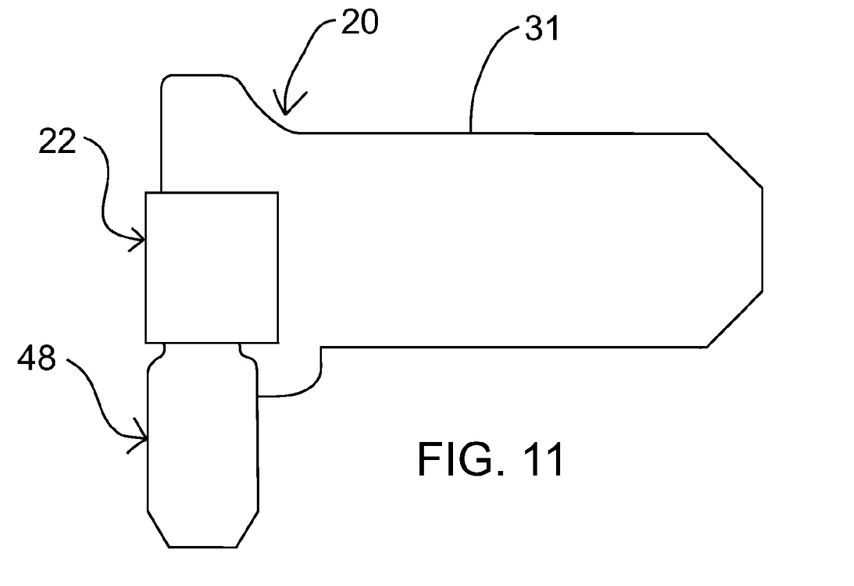
FIG. 11 illustrates another embodiment of the invention including an electrical connection terminal having a male blade.

FIG. 11 illustrates another embodiment of the invention including an electrical connection terminal 20 including an electrical connector portion 31 which is a male blade. The electrical terminal 20 includes at least one weld terminal tab 22 as described above.

Figure 12:
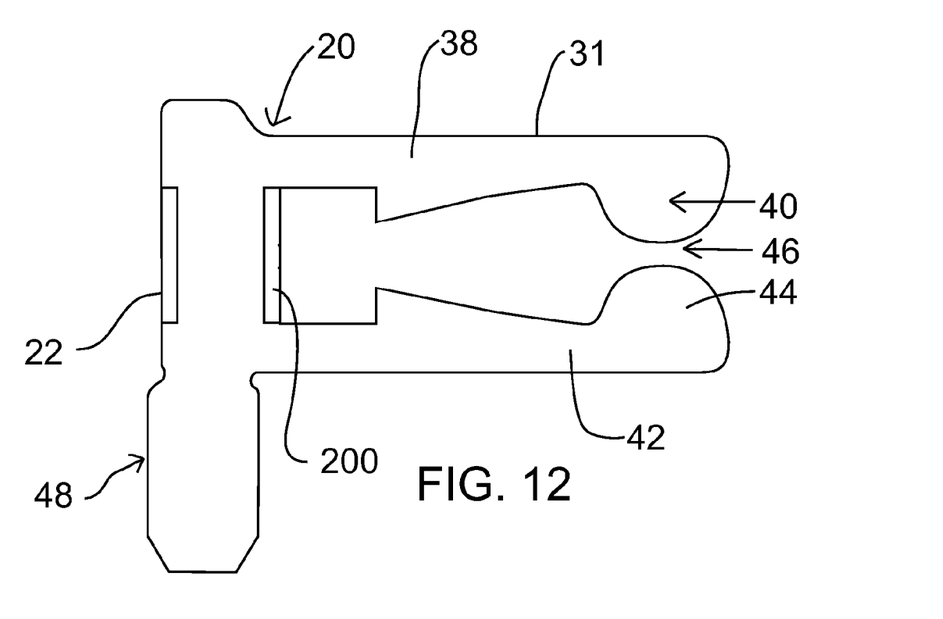
FIG. 12 illustrates another embodiment of the invention including an electrical connection terminal having two weld tabs.
Figure 13:
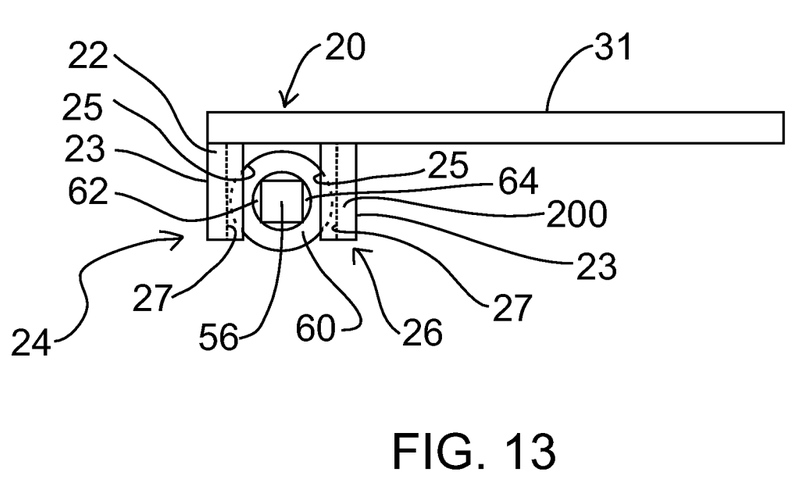
FIG. 13 is a top view illustrating another embodiment of an electrical connection terminal including two weld tabs.

FIG. 12 illustrates another embodiment of the invention including an electrical terminal 20 which includes a first weld tab 22 and a second weld tab 200. In this embodiment, the first weld tab 22 and the second weld tab 200 do not necessarily wrap around the post to which they will be welded. FIG. 13 is a top view of an electrical connection terminal 20 similar to that shown in FIG. 12. The electrical terminal 20 includes an electrical connector portion 31 and a first weld tab 22 which is constructed in a similar fashion as segment 24 illustrated in FIGS. 2-3 and 6. The electrical terminal 20 also includes a second weld tab 200 which may be constructed in a fashion similar to the second segment 26 of weld tab 22 shown in FIGS. 2-3 and 6.

Figures 14, 15:
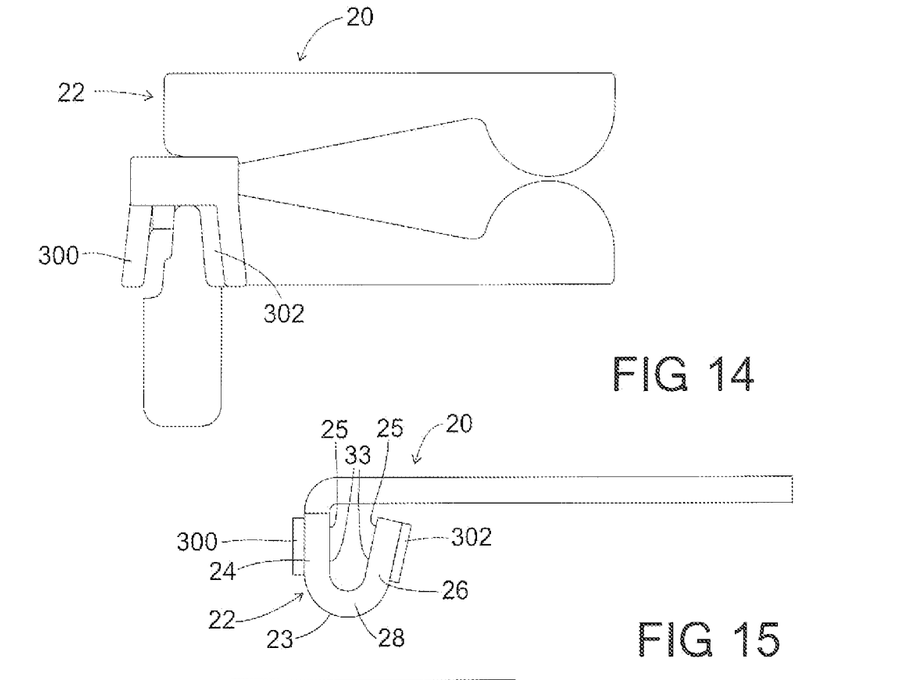
FIG. 14 is a front view of another embodiment of the invention including a product including an electrical connection terminal.
FIG. 15 is a top view of a product of FIG. 14.
Figure 16:
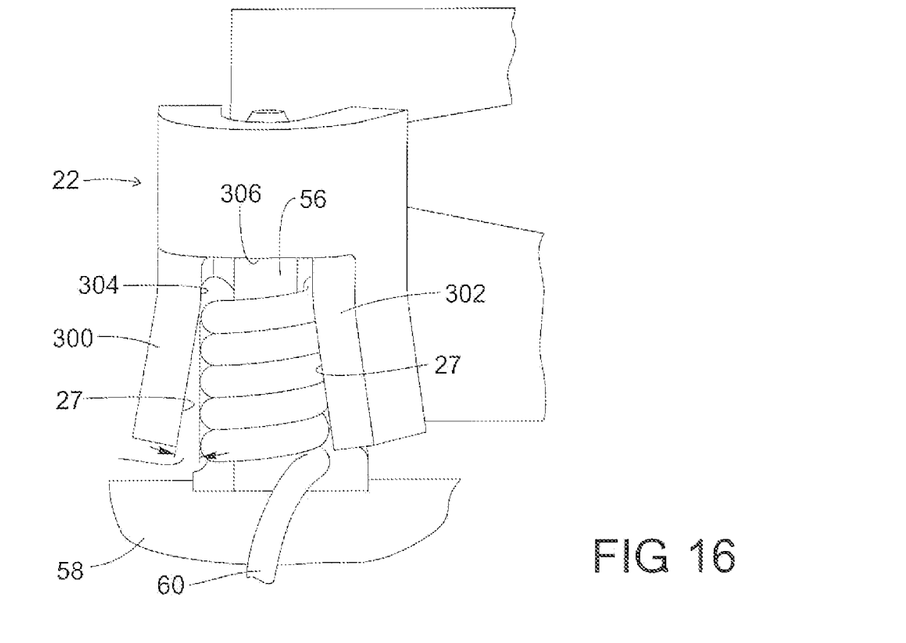
FIG. 16 is a perspective view of a product of FIG. 14 including an electrical connection terminal and a solenoid valve including a post having a portion of a wire wound around the post.

FIGS. 14-16 illustrate another embodiment of the electrical connection terminal 20 having at least one terminal weld tab 22. The terminal weld tab 22 may include the first tab segment 24, the second tab segment 26, and the third tab segment 28 interposed the first tab segment and the second tab segment. Each of the tab segments, if present, may include the outer face 23 and the weldable inner face 33. The weldable inner face 33 may include the substantially planar first portion 25 and the substantially planar second portion 27, wherein the planar first portion 25 and the planar second portion 27 are not in the same plane. The terminal weld tab 22 may be constructed and arranged with a first flared tab portion 300 and a second flared tab portion 302 that together provide the magnetic wire squeeze limiter which limits the amount of pressure that can be applied to the wire 60 wrapped around the post 56 during the welding process. One or more of the flared tab portions may be provided in other embodiments. The post 56 may be secured to the bobbin 58 around which the wire 60 may be wrapped to provide the magnetic coil.

The first flared tab portion 300 and the second flared tab portion 302 serve as the magnetic wire squeeze limiter by limiting the pressure applied by the electrodes 74 and 76 to the wire 60 at the second portion 54. Each flared portion may be bent at an angle $\theta$ with respect to the first, second, and third tab segments 24, 26, and 28. As shown, the angle $\theta$ may be about 8-12°. Such an angle imparts a certain amount of resiliency in the flared tab portions such that when the electrodes 74 and 76 squeeze and bend them during welding, the flared tab portions exert a counterforce which limits the total amount of force exerted on the wire 60 at the flared tab portions. The first flared tab portion 300 extends from the first tab segment 24 while the second flared tab portion 302 extends from the second tab segment 26. Each of the flared tab portions may define a plane that constitutes the planar second portion 27 in this embodiment. A step 304 may be impressed between the respective flared tab portions and the tab segments to create a slight offset between the planar first portion 25 and the planar second portion 27 even when the planar portions are welded to the post 56 and the wire 60. A cutout 306 may be slit between the first flared tab portion 300 and the second flared tab portion 302 such that when the electrodes 74 and 76 squeeze the flared tab portions, a section of the wire 60 is not directly squeezed by the flared tab portions or any other portion.

The electrical terminal 20 as described herein may be made from any electrically conductive material known to those skilled in the art and may include materials that are weldable, or may include at least one coating thereon that is weldable. In one embodiment of the invention, the electrical terminal 20 is made from a metal comprising a copper alloy, a brass alloy, or the like which optionally may be plated or coated with a first layer, such as nickel. A second layer may overlie first layer or may be deposited directly on the underlying base metal material. The second layer, in one embodiment of the invention, includes tin. Likewise, the post 56 may be made out of any electrically conductive material and may be made from a weldable material or may include a weldable coating thereon. In one embodiment of the invention, the post 56 includes a base metal comprising iron and carbon, and an optional first layer thereon comprising nickel. A second layer may be deposited directly on the base metal or over the optional first layer. The second layer, in one embodiment of the invention, may include tin.

The above description of embodiments of the invention is merely exemplary in nature and, thus, variations thereof are not to be regarded as a departure from the spirit and scope of the invention.

What is claimed is:

1. A product comprising:
an electrical connection terminal (20) comprising at least a first weld tab (22), the first weld tab (22) comprising an outer face (23) and a weldable inner face (33), the weldable inner face (33) comprising a substantially planar first portion (25) and a substantially planar second portion (27), and wherein the first portion (25) and second portion (27) are not in the same plane,
wherein the first weld tab is a single piece and wherein the first portion has a thickness different than the thickness of the second portion.

2. A product as set forth in claim 1 wherein the terminal (20) comprises a base material and at least a first coating thereon comprising tin.

3. A product as set forth in claim 1 further comprising a post (56), and wherein the terminal (20) comprises a base with material and at least a first coating comprising tin, and wherein the post (56) comprises a base material and at least a first coating comprising tin.

4. A product as set forth in claim 1 wherein the first weld tab (22) comprises a first flared tab portion (300) and a second flared tab portion (302), wherein each of the flared tab portions are positioned outside of a post 56, and each constituting the second portion (27).

5. A product as set forth in claim 4 wherein the first flared tab portion (300) extends from a first tab segment (24) of the first weld tab (22), and the second flared tab portion (302) extends from a second tab segment (26) of the first weld tab (22).

6. A product as set forth in claim 1 wherein weldable inner face 33 is opposite the outer face 23.

7. A product comprising:
an electrical connection terminal (20) comprising at least a first weld tab (22), the first weld tab (22) comprising an outer face (23) and a weldable inner face (33), the weldable inner face (33) comprising a substantially planar first portion (25) and a substantially planar second portion (27), and wherein the first portion (25) and second portion (27) are not in the same plane wherein the first weld tab (22) is constructed and arranged to wrap around a portion of a post (56), and wherein the post (56) has a first flat face (62) and a second flat face (64), and wherein the weld tab (22) is constructed and arranged to be welded to both of the first flat face (62) and second flat face (64) of the post (56).

8. A product as set forth in claim 7 wherein the post (56) has four sides (62, 64, 66, 68) and the first weld tab (22) is constructed and arranged to wrap around at least three sides of the four sides of the post (56).

9. A product as set forth in claim 7 wherein the post (56) comprises a first flat face (62) and a second flat face (64) and the weld tab (22) is constructed and arranged to wrap over the top (63) of a post and at least a portion of the first flat face (62) and a portion of the second flat face (64).

10. A process comprising:
providing a post (56) and a portion of a wire (60) wound around a portion of the post leaving a portion of the post exposed;
providing an electrical connection terminal (20) comprising at least a first weld tab (22) comprising an outer face (23) and a weldable inner face (33), the weldable inner face (33) comprising a substantially planar first portion (25) and a substantially planar second portion (27), and wherein the first portion (25) and the second portion (27) are not the same plane, and wherein the first weld tab is a single piece;
welding the substantially planar first portion (25) to the exposed portion of the post
and wherein the first portion has a thickness different than the thickness of the second portion.

11. A process as set forth in claim 10 further comprising welding the substantially planar second portion (27) to the portion of the wire (60) wound around the post (56).

12. A process as set forth in claim 10 wherein the post (56) has four sides (62, 64, 66, 68), and wherein the first weld tab (22) is constructed and arranged to wrap around three sides of the post (56).

13. A process as set forth in claim 10 wherein the electrical connection terminal (20) further comprises a second weld tab (200) comprising an outer face (23) and a weldable inner face (33), the weldable inner face (33) of the second weld tab (200) comprising a substantially planar first portion (25) and a substantially planar second portion (27), and wherein the first portion (25) and the second portion (27) of the second weld tab (200) are not in the same plane, and further comprising welding the substantially planar first portion (25) of a second weld tab (200) to an exposed portion of the post (56).

14. A product as set forth in claim 10 wherein the first weld tab (22) comprises a first flared tab portion (300) and a second flared tab portion (302), wherein each of the flared tab portions constitute the second portion (27).

15. A product as set forth in claim 14 wherein the first flared tab portion (300) extends from a first tab segment (24) of the first weld tab (22), and the second flared tab portion (302) extends from a second tab segment (26) of the first weld tab (22).

16. A process comprising;
providing a post (56) and a portion of a wire (60) wound around a portion of the post leaving a portion of the post exposed;
providing an electrical connection terminal (20) comprising at least a first weld tab (22) comprising an outer face (23) and a weldable inner face (33), the weldable inner face (33) comprising a substantially planar first portion (25) and a substantially planar second portion (27), and wherein the first portion (25) and the second portion (27) are not in the same plane;
welding the substantially planar first portion (25) to the exposed portion of the post; and
welding the substantially planar second portion (27) to the portion of the wire (60) wound around the post (56) wherein the post (56) includes our sides (62, 64, 66, 68) each having a flat face, and wherein the first weld tab (22) includes a first segment (24), a second segment (26), and a third segment (28) interposed between the first segment (24) and second segment (26), and wherein the first, second and third segments (24, 26, 28) are constructed and arranged to wrap around a portion of the post (56) so that the first segment (24) is adjacent a first side (62) of the post (56), and the second segment (26) is adjacent a second side (64) of the post (56), and wherein the welding further comprises placing a first electrode (74) against the outer face (23) of the first segment (24) and placing a second electrode (76) against the outer surface (23) of the second segment (26) and pressing the second segment (26) and the first segment against the post (56) and so that greater pressure is applied to the substantially planar first portion (25) of the first segment (24) and second segment (26) than is applied to the substantially planar second portion (27) of the first segment (24) and second segment (26) of the weld tab (22).

* * * * *